United States Patent Office 2,704,761
Patented Mar. 22, 1955

2,704,761

5-ACYL-2-MERCAPTOTHIAZOLES

John J. D'Amico, Charleston, W. Va., assignor to Monsanto Chemical Company, St. Louis, Mo., a corporation of Delaware No Drawing. Application June 21, 1952,
Serial No. 294,930

8 Claims. (Cl. 260—299)

The present invention relates to a new class of compounds, namely the 2-mercapto 5-acyl-thiazole compounds. The free mercaptans may be represented by the general formula

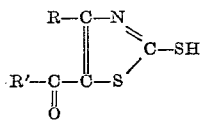

where R and R' represent hydrocarbon groups. The mercapto hydrogen is active and a variety of derivatives have been prepared by replacing the hydrogen by other groups, as for example salt forming groups. Examples of typical salts are zinc, lead, calcium, magnesium, cadmium, potassium and ammonium salts. Substituted ammonium or amine salts are cyclohexylammonium, methyl cyclohexylammonium, dicylclohexylammonium, butylammonium, dibutylammonium, isopropylammonium, dimethylammonium, diethylammonium, diisopropylammonium and dodecylammonium salts. Other groups which may replace hydrogen are —CH$_2$OH, an acyl group as for example benzoyl, a

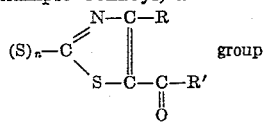

a 2,4-dinitro phenyl group, a

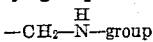

an alkyl group, an allyl group and a

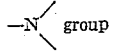

Compounds containing the latter may be obtained, for example, by condensing the mercaptans with formaldehyde and aniline or by condensing the mercaptans with dimethylolurea or dimethylol thiourea.

Another important class are sulfenamides in which compounds the hydrogen of the mercapto group is replaced by an $$-N\diagdown\diagup \text{ group}$$

Suitable examples of this substituting group are an amino or NH$_2$ group, methylamino, ethylamino, isopropylamino, n-butylamino, sec-butylamino, n-amylamino, cyclohexylamino, alpha-methyl cyclohexylamino, alpha-ethyl cyclohexylamino, gamma-methyl cyclohexylamino, benzylamino, alpha-methyl benzylamino, furfurylamino, tetrahydrofurfurylamino, beta-phenethylamino, 2-hydroxy ethylamino, dimethylamino, diethylamino, diisopropylamino, diallylamino, di-n-butylamino, diamylamino, di-beta-phenethylamino, di-2-thenylamino, N-methyl cyclohexylamino, dicyclohexylamino, di-2-cyanoethylamino, morpholinyl, piperidyl, alpha-methylpiperidyl, and gamma-methylpiperidyl. Bis thiazolyl compounds are derived from diamines, as for example 2,5-dimethyl piperazine, piperazine and alkylene diamines. They are represented by such structures as

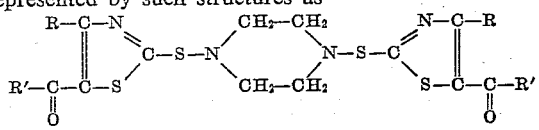

and

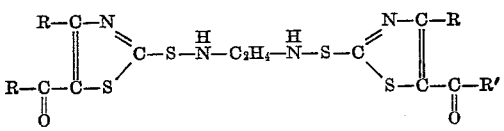

where R and R' have the same significance as before. In the foregoing formulae R and R' are preferably simple alkyl groups such as methyl, ethyl, propyl, butyl, isopropyl, isobutyl and amyl but may be alicyclic or aryl groups such as cyclohexyl, benzyl, phenyl, tolyl, naphthyl, xenyl and the like.

The 5-acyl-2-mercaptothiazoles may be prepared by condensing a 3-chloro-2,4-dione with ammonium dithiocarbamate. For example 3-chloro-2,4-pentanedione was prepared as follows: To 845 grams (8.5 moles) of 2,4-pentanedione in a suitable container provided with a mechanical stirrer, condenser, dropping funnel, thermometer and ice bath, 1140 grams (8.5 moles) of sulfuryl chloride was added dropwise at 0–5° C. over a period of 8.5 hours. The mixture was heated at 90–95° C. for 15 minutes to complete the reaction, then cooled at 25° C., extracted with 500 ml. of 10% aqueous sodium bicarbonate, washed with water until the washings were neutral to litmus and finally dried over sodium sulfate. Distillation of the reaction mixture under 28 mm. pressure gave 880 grams of 3-chloro-2,4-pentanedione, a colorless liquid, B. P. 60–63° C.

236 grams of the 3-chloro-2,4-pentanedione was added to a solution of 194 grams (1.76 moles) of ammonium diethiocarbamate in 1300 grams of water. The reaction mixture was stirred vigorously, the exothermic reaction causing the temperature to rise to about 52° C. and within a short time a solid precipitated. The mixture was stirred for about 8 hours and then the solids filtered off, washed with water until the washings were neutral to litmus and finally dried in an oven at 50° C. There was obtained 226 grams or 74.4% of 2-mercapto-4-methyl-5-thiazolyl methyl ketone, a yellow solid, M. P. 210–211° C. when recrystallized from ethyl alcohol. Analysis for nitrogen gave 8.00% and for sulfur 37.30% as compared to calculated values for C$_6$H$_7$NOS$_2$ of 8.09% nitrogen and 37.01% sulfur.

As exemplary of the preparation of a salt, a solution of 27.4 grams (0.20 mole) of zinc chloride in 1160 grams of water was added with agitation to a solution of 69.3 grams (0.40 mole) of 2-mercapto-4-methyl-5-thiazolyl methyl ketone in 160 grams (0.40 mole) of 10% aqueous sodium hydroxide. The reaction mixture was stirred for one hour, the resulting precipitate filtered, washed with water until the washings were neutral to litmus and finally dried in an oven at 50° C. The zinc salt was a cream powder, M. P. 147–155° C. Analysis gave 6.61% nitrogen and 31.27% sulfur as compared to calculated values for C$_{12}$H$_{12}$N$_2$O$_2$S$_4$Zn of 6.84% nitrogen and 31.29% sulfur. The cadmium salt melted at 193–210° C. with decomposition.

The new compounds comprise valuable fungicides, intermediates, herbicides, adjuvants for lubricating oils and accelerators of vulcanization. As exemplary of the accelerating properties of the free mercaptans rubber stocks were compounded comprising:

| Stock | A | B | C |
| --- | --- | --- | --- |
| Smoked sheets rubber...........parts by weight.. | 100 | 100 | 100 |
| Zinc oxide.................................do.... | 5 | 5 | 5 |
| Stearic acid...............................do.... | 1 | 1 | 1 |
| Sulfur....................................do.... | 3 | 3 | 3 |
| 2-Mercaptobenzothiazole...................do.... | 1 | | |
| 2-Mercapto-4-methyl-5-thiazolyl methyl ketone parts by weight.. | | 1 | |
| Zinc salt of 2-mercapto-4-methyl-5-thiazolyl methyl ketone.........................parts by weight.. | | | 1 |

The stocks so compounded were vulcanized in the usual manner by heating in a press for different periods of time at 135° C. The physical properties of the vulcanizates are set forth below:

TABLE I

| Stock | Cure Time in Mins. | Modulus of Elasticity in lbs./in.² at Elongation of 500% | Tensile at Break in lbs./in.² | Ultimate Elongation, Percent |
|---|---|---|---|---|
| A | 30 | 523 | 2,886 | 746 |
| B | 30 | 810 | 3,575 | 730 |
| C | 30 | 640 | 2,760 | 780 |
| A | 45 | 445 | 3,110 | 785 |
| B | 45 | 655 | 3,385 | 730 |
| C | 45 | 650 | 3,025 | 765 |

It will be noted that the acyl substituted thiazole is a stronger accelerator than mercaptobenzothiazole.

Disulfides may be prepared directly from the mercapto thiazoles by oxidation. In spite of the presence of the carbonyl group, oxidation of the 5-acyl mercapto thiazoles with ammonium persulfate, chlorine, hydrogen peroxide, sodium hypochlorite and other oxidizing agents converts the 5-acyl mercapto thiazoles smoothly to disulfides. The reaction may be conveniently carried out in aqueous medium employing either a suspension of the free mercapto thiazole or a solution of an alkali metal salt thereof. Monosulfides may be prepared from the disulfides by reaction with sodium cyanide. The disulfides take up additional sulfur on heating therewith to form higher sulfides. Additionally, higher sulfides may be produced by reacting the 5-acyl mercapto thiazoles with sulfur halides.

The following example illustrates in detail the preparation of a disulfide.

A fine suspension of 69.3 grams (0.40 mole) of 2-mercapto-4-methyl-5-thiazolyl methyl ketone in 400 ml. of water was prepared in a one liter, three-necked flask, equipped with a mechanical stirrer, dropping funnel, and a thermometer. To this agitated slurry there was added dropwise 339 grams (0.44 mole) of a 30% aqueous solution of ammonium persulfate in 30 minutes at 25–30° C. The mixture was stirred for two hours longer, the precipitate filtered off, and dried at 50° C. The product, a tan solid, was obtained in 99.0% yield. After crystallization from ethyl alcohol it melted at 92–93° C. Analysis gave 8.09% nitrogen and 37.22% sulfur as compared to the calculated values for 2,2'-dithiobis-(5-acetyl-4-methylthiazole), $C_{12}H_{12}N_2O_2S_4$, of 8.13% nitrogen and 37.23% sulfur. The molecular weight obtained by the freezing point method using benzene as the solvent was 342.0; calculated 344.5.

As an example of the accelerating activity of the new disulfides as compared to the commercial accelerator 2,2'-dithiobis benzothiazole vulcanizable compositions were compounded comprising

| Stock | D | E | F | G |
|---|---|---|---|---|
| Smoked sheets rubber....parts by weight | 100 | 100 | 100 | 100 |
| Zinc oxide....do | 5 | 5 | 5 | 5 |
| Stearic acid....do | 1 | 1 | 1 | 1 |
| Sulfur....do | 3 | 3 | 3 | 3 |
| 2,2'-Dithiobis benzothiazole....do | 1 |  | 0.7 |  |
| 2,2'-Dithiobis-(5-acetyl-4-methyl-thiazole parts by weight |  | 1 |  | 0.7 |
| Diphenyl guanidine....do |  |  | 0.3 | 0.3 |

The unactivated stocks were cured in the usual manner by heating in a press for 45 minutes at 135° C. and those containing the diphenyl guanidine activator were cured by heating for 15 minutes at the same temperature.

TABLE II

| Stock | Modulus of Elasticity in lbs./in.² at Elongation of 500% | Tensile at Break in lbs./in.² | Ultimate Elongation, Percent |
|---|---|---|---|
| D | 540 | 2,903 | 793 |
| E | 765 | 3,260 | 750 |
| F | 1,380 | 4,360 | 700 |
| G | 1,780 | 4,295 | 665 |

*5-acetyl-N,N-diethyl-4-methyl-2-thiazolesulfenamide*

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 73 grams (1.0 mole) of diethylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 170 ml. (15.0 g./100 ml.) of sodium hypochlorite solution. The excess sodium hypochlorite was destroyed by the addition of one gram of sodium sulfite. The reaction mixture was cooled to 10° C., extracted with 500 ml. of ethyl ether, the ether extract washed with water until the washings were neutral to litmus, dried over sodium sulfate, and finally the ether removed in vacuo. A yield of 25 grams of a dark oily product was obtained. Analysis gave 11.52% nitrogen and 26.31% sulfur as compared to 11.46% nitrogen and 26.24% sulfur calculated for $C_{10}H_{16}N_2OS_2$.

*5-acetyl-N-cyclohexyl-4-methyl-2-thiazolesulfenamide*

An aqueous solution containing 43.3 grams (0.25 mole) of 2-mercapto-4-methyl-5-thiazolyl methyl ketone, 170 grams of water, and 40.0 grams (0.25 mole) of a 25% aqeuous sodium hydroxide solution was prepared in a one liter narrow beaker equipped with a mechanical mixer, dropping funnel, ice bath, and thermometer. To this solution at 15° C., 99 grams (1.0 mole) of cyclohexylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 170 ml. (15.0 g./100 ml.) of sodium hypochlorite solution. The excess sodium hypochlorite was destroyed by the addition of one gram of sodium sulfite. The yellow solid precipitate was removed by filtration, washed with water and dried at room temperature. 47 grams representing a yield of 69.8% was obtained, M. P. 114–115° C. Analysis gave 10.39% nitrogen and 23.27% sulfur as compared to 10.36% nitrogen and 23.72% sulfur calculated for $C_{12}H_{18}N_2OS_2$.

*5-acetyl-N-isopropyl-4-methyl-2-thiazolesulfenamide*

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 59.1 grams (1.0 mole) of monoisopropylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of three hours, 190 ml. (15.0 g./100 ml.) of sodium hypochlorite solution. The excess sodium hypochlorite was destroyed by the addition of one gram of sodium sulfite. The reaction mixture was cooled to 10° C., extracted with 500 ml. of ethyl ether, the ether extract washed with water until the washings were neutral to litmus, dried over sodium sulfate, and finally the ether removed in vacuo. The residue remaining after the removal of the ether was a semi-solid. The latter was diluted with water, the solid removed by filtration and dried at room temperature. 40 grams representing a 69.5% yield of a tan solid was obtained, M. P. 50–52° C. Analysis gave 11.97% nitrogen and 27.72% sulfur as compared to 12.16% nitrogen and 27.84% sulfur calculated for $C_9H_{14}N_2OS_2$.

*4-(5-acetyl-4-methyl-2-thiazolylsulfenyl)morpholine*

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 65.5 grams (0.75 mole) of morpholine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 160 ml. (15.0 g./100 ml.) of sodium hypochlorite solution. The excess sodium hypochlorite was destroyed by the addition of one gram of sodium sulfite. The solids were removed by filtration, washed with water and dried at room temperature. The product was a buff solid, M. P. 115–116° C. The yield was 56 grams or 86.7% of theoretical. Analysis gave 11.08% nitrogen and 24.47% sulfur as compared to 10.84% nitrogen and 24.82% sulfur calculated for $C_{10}H_{14}N_2O_2S_2$.

As exemplary of the accelerating activity of sulfenamides rubber stocks were compounded comprising:

| Stock | H | J | K |
|---|---|---|---|
| Pale crepe rubber...........parts by weight.. | 100 | 100 | 100 |
| Furnace carbon black........................do.... | 50 | 50 | 50 |
| Zinc oxide...................................do.... | 5 | 5 | 5 |
| Saturated hydrocarbon softener............do.... | 3 | 3 | 3 |
| Stearic acid................................do.... | 2 | 2 | 2 |
| Sulfur......................................do.... | 2.5 | 2.5 | 2.5 |
| Condensation product of p-amino biphenyl and acetone.....................................do.... | 1.5 | 1.5 | 1.5 |
| 5 - Acetyl - N,N - diethyl-4-methyl-2-thiazolesulfenamide.........................parts by weight.. | 0.8 | | |
| 5 - Acetyl - N - cyclohexyl - 4 - methyl - 2 - thiazolesul enamide.........................parts by weight.. | | 0.8 | |
| 4 - (5-Acetyl-4-methyl-2-thiazolylsulfenyl) - morpholine.............................parts by weight.. | | | 0.8 |

The stocks so compounded were cured in the usual manner by heating in a press for 30 minutes at 144° C. The physical properties of the vulcanizates are set forth below:

TABLE III

| Stock | Modulus of Elasticity in lbs./in.² at Elongation of 300% | Tensile at Break in lbs./in.² | Ultimate Elongation, Percent |
|---|---|---|---|
| H | 2,980 | 4,205 | 413 |
| J | 3,210 | 4,170 | 415 |
| K | 3,113 | 4,133 | 406 |

Evaluation of the processing safety of the stocks by means of a Mooney plastometer revealed that 5-acetyl-N-cyclohexyl-4-methyl-2-thiazolesulfenamide and 4-(5-acetyl-4-methyl-2-thiazolylsulfenyl)morpholine were delayed action type accelerators equivalent in processing safety to the commercial accelerator N-cyclohexyl-2-benzothiazolesulfenamide. On the other hand 5-acetyl-N,N-diethyl-4-methyl-2-thiazolesulfenamide was an accelerator of a different type possessing no significant delayed action.

*2 - (3 - chloro - 2 - butenylmercapto) - 4 - methyl - 5 - thiazolyl methyl ketone*

An aqueous solution was prepared containing in 600 ml. of water 86.63 grams (0.5 mole) of 2-mercapto-4-methyl-5-thiazolyl methyl ketone, 80 grams (0.5 mole) of 25% aqueous sodium hydroxide and a small amount of a surface active agent. To this solution was added 62.5 grams (0.5 mole) of 1,3-dichloro-2-butene. The mixture was then stirred for six hours. The temperature rose from 30° C. to 40° C. in about ten minutes as a result of the exothermic reaction. The reaction mixture was extracted with 700 ml. of ether, the ether extract washed with water until neutral and dried over sodium sulfate. After removal of the ether in vacuo there was obtained 120 grams or a yield of 91.9% of an amber oil which decomposes on distillation.

*2 - (2 - chloroallylmercapto) - 4 - methyl - 5 - thiazolyl methyl ketone*

Into a suitable container there was charged 86.63 grams (0.5 mole) of 2-mercapto-4-methyl-5-thiazolyl methyl ketone, 600 ml. of acetone, 20 ml. of water and 28.2 grams (0.5 mole) of potassium hydroxide. The mixture was stirred for about 15 minutes to effect solution and the insoluble impurities remaining separated by filtration. To the solution so prepared 55.5 grams (0.5 mole) of 2,3-dichloro-1-propene was added at once as in the foregoing example and the mixture stirred for six hours at 55–56° C. The reaction mixture was then cooled to room temperature and the salt removed by filtration and the acetone by distillation in vacuo. The residue was dissolved in 500 ml. of ethyl ether, the ether extract washed with 2% sodium hydroxide and then with water until the washings were neutral to litmus and dried over sodium sulfate. Removal of the ether in vacuo left 110 grams representing a yield of 89% of a dark amber oil. This product cannot be distilled. Decomposition took place upon attempted distillation at 1 mm. pressure. Analysis of the crude product gave 5.27% nitrogen and 14.48% chlorine as compared to calculated values of 5.65% nitrogen and 14.31% chlorine for $C_9H_{10}ClNOS_2$.

*5-acetyl-4-methyl-2-thiazolyl diethyl dithiocarbamate*

Into a suitable container was charged 52 grams (0.3 mole) of 2-mercapto-4-methyl-5-thiazolyl methyl ketone, 600 ml. of acetone, 20 ml. of water and 12 grams of sodium hydroxide. The mixture was stirred to effect solution and to this solution there was gradually added at a temperature of 32° C. over a period of 25 minutes a solution of 45.4 grams (0.3 mole) of diethyl dithiocarbamyl chloride dissolved in 200 ml. of acetone. The reaction mixture was then stirred for four hours, the sodium chloride removed by filtration, the acetone removed in vacuo and the solids separated from the residue by filtration. The solids were washed with water and air dried at 25° C. The product so obtained was a brown solid, M. P. 71–72° C. when crystallized from ethyl alcohol and water. The yield was 77 grams or 89%. Analysis gave 9.90% nitrogen and 33.40% sulfur as compared to 9.71% nitrogen and 33.35% sulfur calculated for $C_{11}H_{16}N_2OS_3$.

*2,4,6-tris(5-acetyl-4-methyl-2-thiazolyl)-s-triazine*

A solution was prepared containing 69.3 grams (0.4 mole) of 2-mercapto-4-methyl-5-thiazolyl methyl ketone and 22.4 grams of potassium hydroxide in 580 ml. of acetone. To this solution a solution of 24.5 grams (0.133 mole) of cyanuric chloride in 500 ml. of acetone was added dropwise at 50° C. The reaction mixture was then heated at 55–56° C. for four hours and allowed to cool to 25° C. and the solid product filtered off, washed with water until free of chloride and dried at 50° C. The tan product obtained in a yield of 57 grams or 72.4% melted at 185–187° C. Analysis gave 14.78% nitrogen and 32.10% sulfur as compared to 14.13% nitrogen and 32.34% sulfur calculated for $C_{21}H_{18}N_6O_3S_6$.

It is intended to cover all changes and modifications of the examples of the invention herein chosen for purposes of disclosure which do not constitute departures from the spirit and scope of the invention.

What is claimed is:

1. A compound of the structure

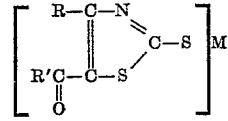

where R and R' represent hydrocarbon groups containing less than 13 carbon atoms and M is selected from a group consisting of metal, ammonium, monocyclohexylammonium, dicyclohexylammonium, monoalkylammonium containing less than 13 carbon atoms, dialkylammonium containing less than 5 carbon atoms in each alkyl group and lower N-alkyl N-cyclohexylammonium salt forming groups and hydrogen.

2. A compound of the structure

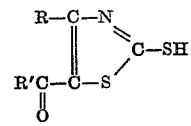

where R and R' represent hydrocarbon groups containing less than 13 carbon atoms.

3. A compound of the structure

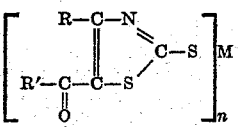

where R and R' represent alkyl groups of less than 6 carbon atoms and M represents a metal salt forming group and $n$ is the valence of the metal.

4. A compound of the structure

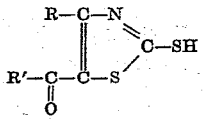

where R and R' represent alkyl groups of less than five carbon atoms.

5. A compound of the structure

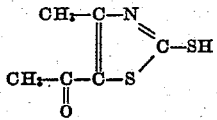

6. A compound of the structure

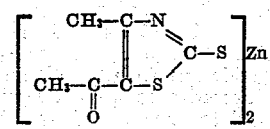

7. The method of making a 5-carboxylic acyl-2-mercaptothiazole having alkyl groups of less than 6 carbon atoms in the 4-position and attached to the carbonyl group in the 5-position which comprises condensing a 3-chloro-2,4-alkanedione having alkyl groups of less than 6 carbon atoms attached to the carbonyl groups with ammonium dithiocarbamate.

8. The method of making 2-mercapto-4-methyl-5-thiazolyl methyl ketone which comprises condensing 3-chloro-2,4-pentanedione with ammonium dithiocarbamate.

No references cited.